Feb. 7, 1928.  1,658,673
R. F. M. FONTAINE
PROGRESSIVE AND AUTOMATIC CHANGE SPEED DEVICE
EMPLOYING EPICYCLOIDAL GEARING
Filed April 25, 1927    2 Sheets-Sheet 2

INVENTOR.
R. F. M. Fontaine
By William C. Linton
Attorney.

Patented Feb. 7, 1928.

1,658,673

UNITED STATES PATENT OFFICE.

RENÉ FRANÇOIS MICHEL FONTAINE, OF PARIS, FRANCE.

PROGRESSIVE AND AUTOMATIC CHANGE-SPEED DEVICE EMPLOYING EPICYCLOIDAL GEARING.

Application filed April 25, 1927, Serial No. 186,303, and in France May 4, 1926.

This invention relates to a progressive and automatic change-speed device employing epicycloidal gearing.

The change-speed devices employed upon motor vehicles serve to operate the vehicle at different speeds while the engine is maintained at its maximum power.

The change-speed devices with sliding gear sets which are in current use upon motor vehicles provide for the speed reduction only by successive steps, and they require a control having a complex nature. Furthermore, the difficulties in the control of the apparatus will increase rapidly with the effort to be transmitted, so that such apparatus are hardly acceptable when the power of the engine exceeds 100 horse power.

The present invention relates to a change-speed device of a progressive nature which is automatically controlled by the variations in the load.

The said apparatus comprises epicycloidal gearing and is constructed according to the following theoretical considerations which may be more conveniently followed with reference to Fig. 1 of the appended drawings.

Considering the case of epicycloidal gearing of the type represented, it is observed that there will exist between the speed $Va$ of the central pinion A, the speed $Vb$ of the internal gear B, the speed $Vc$ of the arm C carrying the planetary pinion, and the radii $Ra$ and $Rb$ of the wheels A and B, the following general relation:

$$RaVa + RbVb = (Ra+Rb)Vc.$$

The speed $Vc$ being supposed constant, if $Va=0$ in the preceding equation, i. e; if the wheel A is held fast, the wheel B will rotate at a speed $Vb = \dfrac{Ra+Rb}{Rb} Vc$ which is greater than $Vc$. Inversely, if $Vb=Vc$ in the equation, i. e; if the wheel B is rotated at the same speed as the lever C, the wheel A will also rotate at this speed, so that $Va=Vc$.

If the arm C is keyed to the driving shaft of a motor vehicle and the wheel A to the actuated shaft, the movement may be imparted from one to the other with a progressively varying speed ratio by gradually reducing the speed $Vb$ of the wheel B from the value $\dfrac{Ra+Rb}{Rb} = Vc$, for which the actuated shaft is motionless, to the speed $Vc$ for which this shaft rotates at the same speed as the driving shaft.

This result may be obtained by the use of an arrangement which is shown diagrammatically in Fig. 1. The displacement of the wheel B is limited, in the direction in which it tends to be produced by self action, by means of the irreversible worm D which is actuated by the arm C, i. e; by the driving shaft, through the medium of a power transmission which is actuated together with the wheel B and is provided with a speed-changing device comprising a disc and a plate E. This friction drive can always be effected, since the effort to be transmitted by the said worm can be made as small as desired by choosing a worm whose threads make an angle as close as is necessary to the angle of reversibility.

The automatic action of the speed reduction, i. e; of the control of the friction disc may be obtained by means of a governor in the shape of a flywheel operating by centrifugal force resembling those employed for regulating industrial motors and mounted upon the actuated shaft; said governor will act, for a given admission of fuel, to obtain the speed reduction in proportion to the load. To slow up or accelerate the vehicle, it is simply necessary to reduce or to increase this fuel admission, and the vehicle can be handled by simply operating the accelerator.

A change-speed device in accordance with the invention essentially consists of five sets of mechanical parts, as follows:

1. Epicycloidal gearing of the type specified.
2. A transmission device comprising a disc and a friction roller, which variable speed ratio, disposed between the driving shaft and the worm actuating the outer toothed ring.
3. A flywheel governor of the centrifugal type actuated by the load shaft.
4. A change-speed device comprising gear sets for back motion.
5. A ratchet device by which the engine is made independent of the wheels when the vehicle is impelled by kinetic energy.

The whole arrangement is inclosed in a tight casing and the mechanism is lubricated by an oil bath.

Figs. 2 to 6 of the appended drawings show by way of example a practical embodiment of the invention.

Fig. 3 is a section on the axis A—A of Fig. 2.

Figs. 4 and 5 show the governor half in axial section and half in elevation on the one hand and in section perpendicular to the axis on the other hand.

Fig. 6 is a diagrammatic view of the device employed for the back motion.

Figure 1:
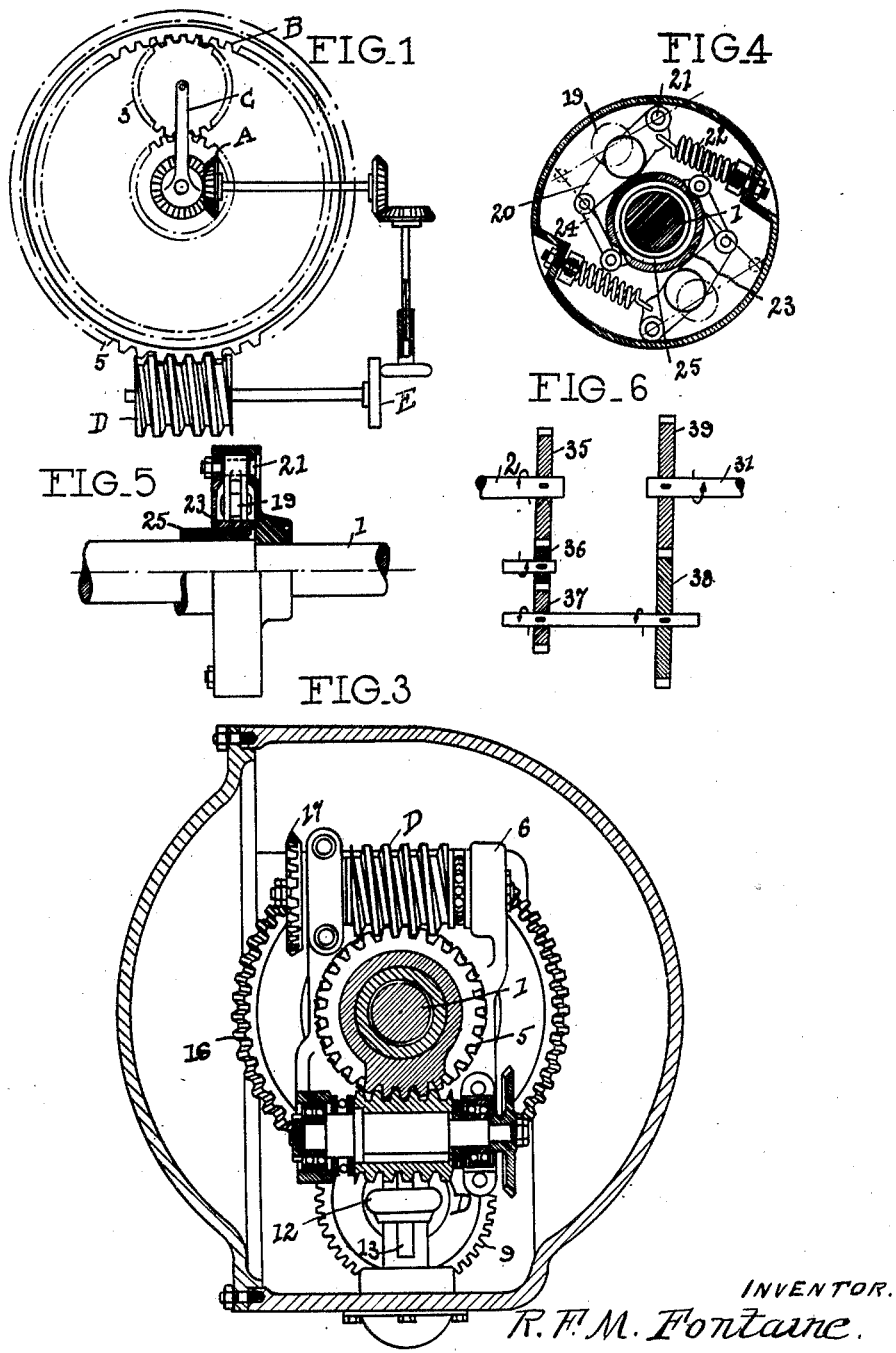

In the example herein represented, the driving shaft 1 and the actuated shaft 2 are disposed in line; to the driving shaft is keyed the lever C which carries two or four planetary pinions 3, which are engaged on one side with the pinion A mounted on the actuated shaft and on the other side with the internal gear B which is disposed in a casing 4 provided with annular journals supported by two ball bearings.

A gear wheel 5 secured to said casing co-operates with two worms D which are symmetrically mounted in a support 6 which is keyed to the driving shaft. To obviate all vibrations of the shafts such as would cause abnormal friction offering prejudice to the efficiency of the power transmission parts, the main shafts are exactly centered in the said casing by means of two ball bearings which are mounted as near as possible to their ends.

The drive between the shaft 1 and the worm D is effected by the following parts, which comprise a shaft 7 which is mounted in the casing and is parallel with the driving shaft 1; it is actuated by the gear wheels 8 and 9 and carries a friction disc 10. A spring 11 which abuts at its end serves to produce the adhesion of the said disc with the roller 12 which is mounted on a hollow shaft 13 in such manner that it will be slidable thereon while rotating the said shaft in all positions.

The motion of the shaft 13 is transmitted to the worms D through the medium of the pinions 14 and 15 on one side and the pinions 16 and 17 on the other. Since the axes of the latter are perpendicular but are not in the same plane, the outline of their teeth will be a special hyperbolic outline. The ratio of the teeth for the different gear wheels should comply with the following conditions: firstly, when on direct drive, in which the roller 12 has the limiting position upon the disc 10, the gear wheel 16 shall have the speed $V_c$; secondly when the roller is at the centre of the disc and is motionless, the casing 4 will have the speed $$\frac{Ra + Rb}{Rb} V_c.$$

Figure 2:
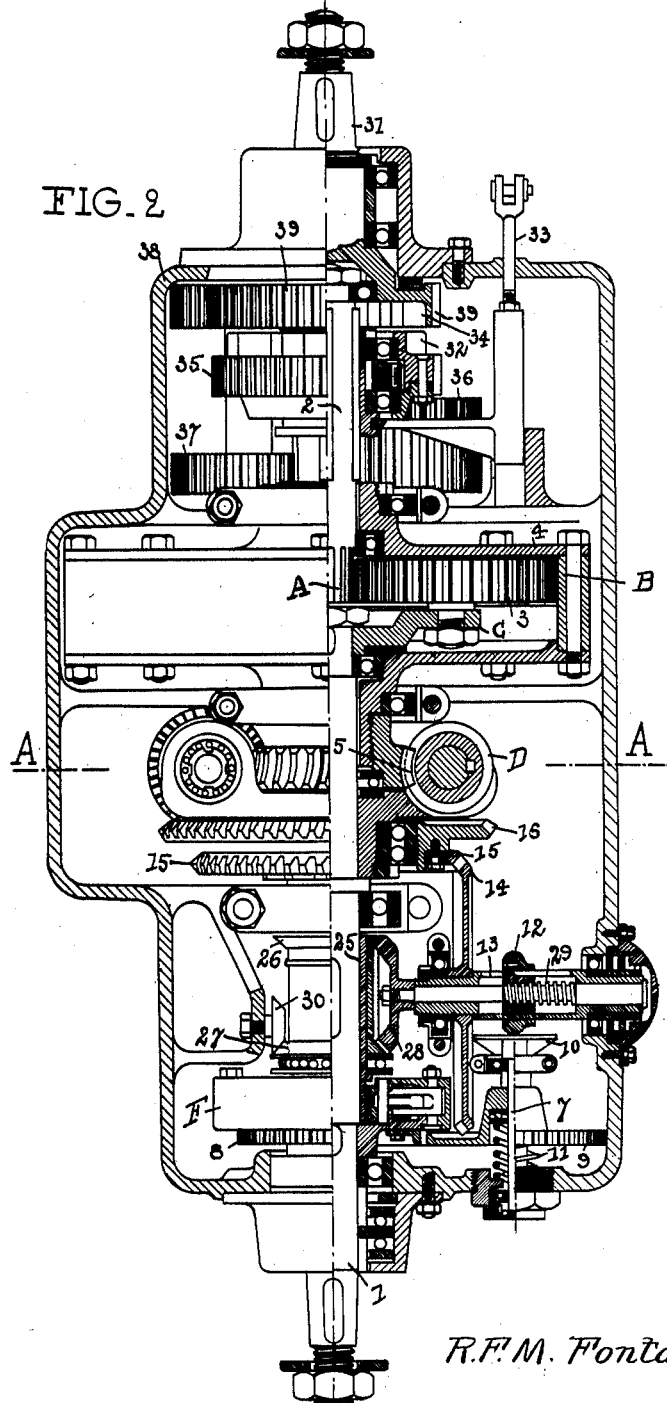
Fig. 2 is a view, half in axial section and half in elevation, with the casing shown in section in the whole figure.

The regulating hand wheel which controls the motion of the roller along its axis is shown at F in Fig. 2 and is represented in detail in Figs. 4 and 5. It comprises two symmetrical masses 19 mounted on the levers 20 journaled at 21 which are urged by centrifugal force and also by two antagonistic springs 22 whose tension is regulated according to the normal speed of the engine.

Any variation in speed will cause a rupture of equilibrium, and the resulting displacement of the masses will be imparted to a nut 23 by means of two links 24.

The rotation of said nut causes the lateral displacement of the sleeve 25 which is keyed to the shaft; at the end of said sleeve are mounted two friction cones 26 and 27 which face one another. The variations in engine speed will bring one or the other of the said cones—according to the direction—into contact with the cone 28 which is keyed to the end of the screw 29 controlling the motion of the roller 12.

The cone 26, which is secured to the said sleeve, will give the roller 12 a motion such that the gear ratio will be reduced. The cone 27, which is loose on the sleeve 25, is held in the fixed position by two tapered rollers 30 as soon as it makes contact with the cone 28.

The aforesaid mechanism differs essentially from the device shown in Fig. 1, by the means provided for the motion of the worm D. In the device shown in Fig. 1, in fact, it has been supposed, to simplify the drawing, that the shaft of this screw, as well as its driving means (bevel gearing, disc and roller), is mounted in a stationary casing; but in the construction shown in Figs. 2 and 3, the mechanism driving the worm D is always stationary, and the said worm rotates on an axis which is rotated together with the driving shaft and the arm C carrying the planetary pinions, so that the speed of rotation which must be given to the worm on its axis in order that the speed of the ring B shall be equal to the speed of the arm C, is much less than what is required by the device shown in Fig. 1.

The reversal of the motion is effected by a set of gearing which resembles the gearing used in the known change-speed devices, which is placed between the shaft 2 and the Cardan shaft 31 of the vehicle to which the motion in either direction is to be transmitted.

This arrangement, which is shown at the dead centre in Fig. 2, comprises a sliding gearset 32 which slides on the shaft 2 but is constantly actuated thereby and is controlled by the lever 33. The said gearing 32 acts by direct drive to determine the forward travel by engaging when moved to the right, with the internal teeth of a clutch ring 34 mounted on the Cardan shaft 31. It is on the other hand secured to the gear wheel 35, and when it is moved to the left for back travel, it engages a pinion 36 loose on a shaft secured to the casing, parallel with the shaft 2 and placed at the rear of the sectional plane of Fig. 2. The pinion 36 engages a pinion 37 mounted in the like manner, acting together with the pinion 38. This latter pinion is in constant engagement with an internal gear 39 placed at the exterior of the clutching ring 34.

The diagram Fig. 6 clearly shows the functioning of the set of gears.

The pinion 35 is mounted on the shaft by means of a ratchet device (of the loose wheel type or the like) so that the wheels can be rotated when the vehicle is driven by the engine, whilst the said device will cut off all connection when the vehicle is driven by kinetic energy.

The operation of the apparatus is as follows:

When the engine is set running, the roller 12 is supposed to make contact with the centre of the friction disc 10; the roller shaft 13 and the pinion 16 are not in motion. The pinion A remains in the fixed position, and no motion is imparted to the wheels. This condition will prevail as long as the engine operates at slow speed, and the transmission device may be considered as out of action.

When the engine speed increases and the normal speed is attained, the governor F will act to bring the cones 26 and 28 into contact, and this causes the rotation of the screw 29, effecting a lateral displacement—along the disc 10—of the roller 12 which begins to rotate; by means of the gearing 14—15—16—17 this motion is imparted to the worm D engaging the wheel 5 secured to the casing 4. The speed of rotation of the wheel B of the epicycloidal set mounted on the casing is thus gradually reduced, and the starting is thus effected.

The variation of the speed reduction is continuous and in the same direction, until a balance is obtained between the effort of resistance and the effort of the engine at normal speed. The equilibrium of the governing wheel is thus again established, and since the cone 28 becomes free the roller 12 remains motionless and the value of the speed ratio is now constant.

Since the resulting speed depends upon the position of the accelerator and on the value of the effort of resistance, all variations of speed which the power of the engine allows may be obtained by the sole operation of the accelerator. For slow speed or stopping, the accelerator is left free; the vehicle is moved forward by its kinetic energy, and the ratchet disposition of the sliding set 32 assures the independence of the engine which rotates at slow speed, so that the governor will at once act and will bring the roller 12 into the position which it occupied when starting.

In addition to the advantages which it offers by reason of the simplified actions to be effected, the said device allows of constantly obtaining the most economical running by the sole use of the normal speed of the engine, irrespectively of the degree of skill possessed by the driver. On the other hand, since the value of the speed ratio is in proportion to the effort of resistance, the starting can always be obtained without excessive stress on the engine, even when the vehicle is overloaded.

Obviously, the invention is not limited to the constructions herein specified which are given solely by way of example and which may be modified in detail, chiefly as concerns the type of governor and the construction of the several power transmission devices.

Furthermore, the invention is not limited to motor vehicles, but may be employed in all cases in which an apparatus comprises a constant-speed motor—for instance a synchronous motor—and in which variable speeds for the actuated devices are to be obtained.

I claim:

1. A progressively variable speed transmission device comprising an oil tight casing, drive actuated and driven shafts journaled therein in a contiguous line, a change speed gearing arranged within one end of said casing for operatively connecting said actuated and driven shafts, an epicycloidal gearing arranged within said casing for operatively connecting said drive and actuated shafts having a casing included therein, a transmission device supported within said casing and operatively connected to the casing of said epicycloidal gearing and a centrifugal type fly-wheel governor mounted upon said drive shaft and arranged within the opposite end of said casing for automatically controlling said transmission device.

2. A variable speed transmission comprising a driving element, a driven element, an epicycloidal gearing for operatively connecting said driving and driven elements, a control element included in said epicycloidal gearing whose speed of rotation is adapted to be automatically controlled, a gear secured to said control element, a support keyed to said driving element, worm gears journaled upon said support and meshing with said gear of the control element, a transmission device for operatively connecting said control element with said driving element, a friction wheel, means for operatively connecting said friction wheel with said worm gears, a governor mounted upon said driving element and means for operatively connecting said friction wheel with said governor whereby said control element may be automatically controlled.

3. A variable speed transmission comprising a housing, drive and driven shafts axially journaled therein, a gear casing journaled upon said shafts, a pinion keyed to said driven shaft, pinions carried by said drive shaft and meshing with said gear casing and pinion of said driven shaft, a gear wheel rotatably mounted upon said drive shaft and secured to said gear casing, a support keyed to said drive shaft, worm gears journalled upon said support and meshing with said gear wheel, a centrifugal type fly wheel governor keyed to said drive shaft, a friction disc adjustably supported within said housing and operatively connected to said drive shaft, a friction roller engageable with said friction disc, bevel gear wheels journalled upon said drive shaft and operatively connected to said worm gears, a bevel gear connected to said friction disc and meshing with one of the aforesaid bevel gear wheels, and means operatively connecting said friction wheel with said governor substantially as and for the purpose specified.

4. A variable speed transmission comprising a drive shaft, a driven shaft and an epicycloidal gearing connecting the said shafts, a control element included in said epicycloidal gearing, a governor secured to said drive shaft, a friction disc operatively connected to said drive shaft, a hollow shaft, a friction wheel carried by said hollow shaft and engageable with said friction disc, means for operatively connecting said hollow shaft with said control element of the epicycloidal gearing, frictional cones operatively connected to said governor, a laterally extending shaft arranged within said hollow shaft and operatively connected to said friction wheel, and a friction cone secured to said laterally extending shaft and adapted to be engaged by said friction cones connected to said governor substantially as and for the purpose specified.

In testimony whereof he has affixed his signature.

RENÉ FRANÇOIS MICHEL FONTAINE.